UNITED STATES PATENT OFFICE.

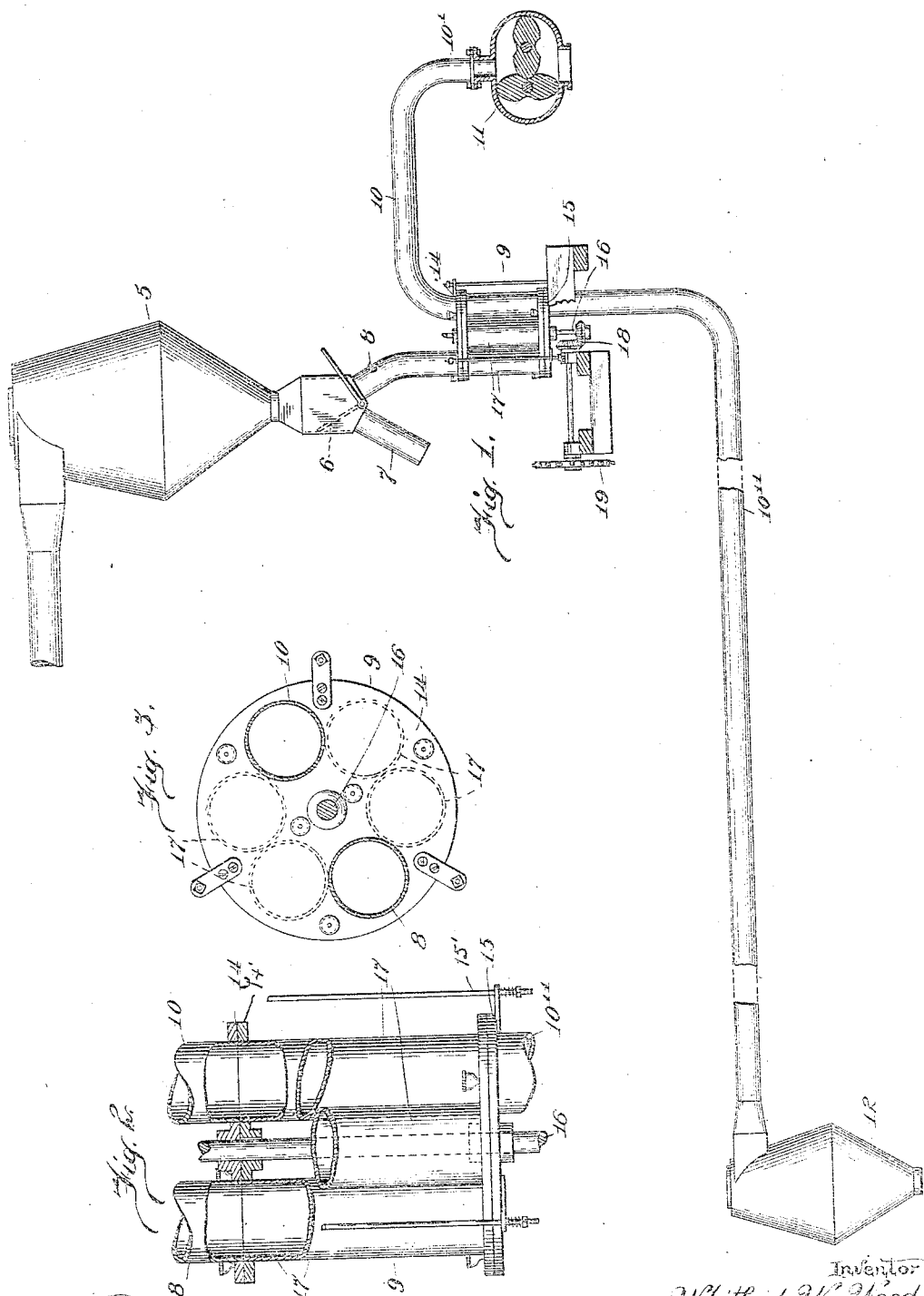

WHITFORD W. WOODLEY, OF ELIZABETH CITY, NORTH CAROLINA.

ART OF DUST-HANDLING.

1,123,155.  Specification of Letters Patent.  Patented Dec. 29, 1914.

Application filed April 15, 1911. Serial No. 621,235.

*To all whom it may concern:*

Be it known that I, WHITFORD W. WOODLEY, a citizen of the United States, residing at Elizabeth City, in the county of Pasquotank and State of North Carolina, have invented certain new and useful Improvements in the Art of Dust-Handling, of which the following is a specification.

My invention relates to the art of dust handling and it consists in a new and advantageous method of handling miscellaneous materials in "long-blow" pneumatic systems.

"Dust," it will be understood, is a term employed generically to designate materials composed of separated particles susceptible of being air conveyed in blow piping; and the designation "miscellaneous materials" I employ as defining "dust" in which the particles are widely variant in those characteristics of specific gravity, size, shape, surface conditions, etc., which affect the action thereof under the influence of a conveying air current. As a typical example, the "dust" from wood-working plants, composed of mixed particles varying from blocks and splinters, through chips and shavings, to saw-dust and nearly impalpable powder, may be considered to constitute such a "miscellaneous material," and for the purposes of full disclosure, the following description is developed with that concrete example in mind, but with intent only clearly to illustrate and not to limit the practical application of the invention.

In many instances, as in wood-working establishments, it is necessary to convey miscellaneous material, preliminarily gathered or collected at one point in the plant, through blow piping, to a relatively remote point in the plant, and there to deliver or deposit the material. In such wood-working establishments, it is usually the practice to effect an initial collection of the miscellaneous material in a suitable main dust collector; continuously to deliver the material as collected into a blow pipe where it is subjected to the action of an air current to effect its conveyance to the remote point, and there to deliver the dust practically free from air by collecting in a second or terminal dust collector. Heretofore such systems, handling material over long blows—of say upward of five hundred feet, by way of illustration,—have been equipped with a centrifugal fan for air current generation, and universally have been characterized by difficulty in operation under variant conditions, by large expense of installation, incident to the use of piping proportioned in size to the length of the blow and with large fan and collector equipment proportioned to the large piping; and by extravagant expenditure of power necessary to operate the system at all.

The practice of my invention, as against former methods, under the same fundamental conditions of materials—character and quantity, and length of the pipe, attains certainty of operation, decrease in size and expense of the piping and accessories, and very great saving of power.

In such systems heretofore used (which for brevity I may call the old systems), the continuous delivery of the miscellaneous material into the blow piping in loose condition results in the particles being driven by the air at such very different velocities as result from their different physical characteristics, the manner of introducing the particles into the air current aggravating the natural tendency of the material to stratify and separate. Thus, there is at once engendered a deleterious tendency of the material to mass in the piping, due to faster traveling particles overtaking slower traveling particles during the interval of time in which they are traveling through the blow piping, in such quantities as more or less to clog the discharge pipe. Therefore, in order that the system may work at all, the discharge pipe must be so proportioned throughout its entire length as to prevent the maximum mass which may gather from such causes in traversing the pipe from clogging the pipe, and obviously the longer the piping and the greater the time of traverse thereof, the greater the clogging tendency becomes, and therefore, the larger the pipe must be in diameter. Thus, briefly stated, the piping diameter must be proportioned to the length of the blow. Furthermore, the centrifugal fan employed must be proportioned to the sectional area of the blow piping to maintain the desired velocity, and the terminal dust collector must be proportioned to the volume of air necessary to be handled, so that as the length of the blow is increased, greater size and expense of every part, and greater expenditure of power, must be met.

Again, it is a well known characteristic of centrifugal fans as heretofore used in such systems, that at a given fan speed the delivery of air volume decreases with every increase of resistance, so that at such periods, when clogging tendencies are manifested in the piping, and greatest velocity and pressure are required for the movement of the dust masses tending so to clog the pipes, air velocity is lowered, and furthermore, the introduction of new volumes of material into the piping further reacts upon the fan by increasing the resistance with the added weight of the incoming material. Thus, it will readily be seen that the factor of time enters materially into the old system, and that the entire system, in all of its parts, must essentially be figured on the basis of taking care of the worst conditions that may be encountered in the operation of the plant. Also, it will be clear that the fast multiplying difficulties attendant upon lengthening the blow-distance puts a very short limit upon the distance over which the material can be conveyed with anything like satisfactory service and reasonable expense. I have found that the more that such miscellaneous material may be kept in mass form, the less likely are the differently-characterized particles thereof to travel at such widely different velocities as to cause undue accumulations in the discharge pipe while in transit; and further, I have found, that the effect of delivering the miscellaneous material at the end of the discharge pipe in relatively closely concentrated mass form with a relatively small volume of air is to keep the volume of fine dust inclosed within the coarser moving mass of material, to such a degree that in many instances the use of the terminal dust collector may be dispensed with in systems embodying my invention. Further, by handling the material in such massed form with a small air volume, the terminal dust collector, when employed, may be very much smaller and cheaper than would be required in the old systems to handle the same amount of material but a large volume of air. Further, I find that by using a positive blower, I can effect the materials conveyance through a relatively small pipe, proportioned only with reference to the quantity of material intended to be handled therethrough, and regardless of the length of the blow or the time moment of the conveyance. Thus, I am not only enabled to reduce the size of the piping and the terminal dust collector (if one be used), but by reducing the volume of air handled, I am enabled to cut down the power to a minimum, so economizing in every factor of the system, and vastly extending its practical or feasible range of operation.

In general, my method contemplates the employment of blow piping for blows of from five hundred to two thousand feet, more or less, of small size, proportioned merely to the volume of material to be handled. The current for this piping I generate from a positive blower or other constant volume air current generator. Into the pipe, I introduce relatively concentrated charges of miscellaneous material at such time intervals as to produce initial separation of the charges in the piping, each instant charge being introduced at such time interval after its predecessor that the preceding charge has moved a considerable distance along the pipe before the instant charge enters. At the discharge end of the pipe, I provide means for reducing the velocity of the material, and delivering it gently,—that is, at low velocity substantially free from air blast effect.

In the drawing, wherein I have shown a structure for the practice of my invention, particularly adapted for a wood-working establishment, Figure 1 is a diagram of the system; Fig. 2 is a side elevation of the charger with parts broken away; and Fig. 3 is a plan view of the charger.

5 indicates a dust collector which as far as this invention is concerned constitutes simply a reservoir for miscelleneous material.

6 indicates a valve by which the material may be thrown at will into a local discharge pipe 7, or into a feed pipe 8, for delivery into the long blow system.

9 indicates in general a charger for receiving relatively compact charges of miscellaneous material from the feed pipe 8, and delivering such material in charges at timed intervals into the blow pipe 10.

11 indicates a positive blower for forcing air in substantially constant volume into the receiving end 10′ of the blow pipe for delivery through the charger into the long discharge run 10″ of said blow pipe.

12 indicates the terminal dust collector of well known construction, which in many instances is employed to facilitate proper delivery of the dust, but generically said terminal dust collector may be regarded as merely an enlarged chamber for reducing the materials-velocity and permitting the escape of air, for in many instances the terminal dust collector may be omitted, and the piping arranged to discharge merely into an enlarged chamber in which the material may settle and whence the air may escape.

Each of the principal structures shown, except the charger 9, is, *per se*, a thing well known upon the market, and needs no specific description. Of course, the specific construction of the charger may be varied, but for the handling of miscellaneous material from wood-working plants, its structure should be such that it may receive and deliver widely variant kinds of material without clogging and without substantial air leakage. The specific charger construction shown provides two heads 14 and 15 arranged transversely to the axes of pipes 8 and 10, the pipe 8 opening through an aperture in the head 14, and the delivery and discharge ends 10' and 10'' of the blow pipe 10 opening through registering apertures in heads 14 and 15. The shaft 16 extending axially through the heads 14 and 15, carries in rotation end plates, 14' and 15', accurately fitting against the heads 14 and 15, and connected by lengthwise tubes, 17, preferably so arranged that each time one tube 17 is brought into register with the pipe 8, another registers with the pipe 10. The shaft 16 may be positively rotated intermittently or continuously, gearing 18 typifying any suitable driving means. It will be understood that the drive of the shaft 16 is so timed that tubes 17, successively filled while registering with the pipe 8, are presented at successive time intervals in register with the pipe 10, and manifestly the constant-velocity air current flowing in said pipe 10 sweeps said charges successively out of the charger tubes into the long discharge pipe 10''.

The object of so delivering the miscellaneous material in charges into the discharge pipe with appreciable intervals between the charges, is to create in the discharge pipe spaces comparatively free from material between the charges, such spaces providing areas into which slower traveling or frictionally retarded particles, gradually becoming separated from the main mass of each charge, may travel without retarding the velocity of the particles of subsequent charges, or piling up and forming resistance areas in the progress of the material through the long discharge pipe. Of course, some particles in each charge, by reason of mass, shape, frictional engagement with the pipe, etc., tend to travel more slowly than other particles, differently characterized, and by this process the charges are gradually spread out, so as ultimately to meet each other in a substantially evenly traveling stream after a large part of the distance from the intake point has been traversed, and without having the velocity of the traveling mass as a whole materially reduced. Along toward the end of the discharge pipe, where the air pressure is, of course, reduced, there is a tendency of the material traveling on the surface of the moving mass to run ahead of the slower traveling material, somewhat as happens practically at the outset in the old style system. But these accumulations cause additional resistance in the discharge pipe which the positive blower instantly meets by an increased pressure, engendered by the continuing introduction of constant volumes of air, and the upper particles in travel cannot mass up materially in the presence of this automatically augmenting pressure, but, accelerated by the increase pressure, such incipient masses merely break or roll over somewhat after the fashion of water breaking on a beach, such "breakers" dissipating themselves in the presence of this nearly constant air velocity which thus keeps the whole mass traveling in an almost even layer, and with, as a whole, close-to-uniform velocity, to the ultimate point of delivery.

All of the factors of smaller volume of air, delivery of the material in concentrated charges into the piping, uniformity of travel, and automatic augmentation of pressure in the piping wherever a massing tendency occurs, contribute to the effect of keeping the lighter and heavier materials particles from separating or stratifying, and I find that at the delivery end of the long discharge pipe, the heavier and lighter particles are so intermingled, and are so uniformly delivered that there is comparatively little tendency for the lighter dust particles to scatter, they being carried in mass by the heavier particles, so that there is much less tendency for the fine dust to escape into the atmosphere at the discharge end of the system than is evident in the old system. In actual practice, I have found it possible and feasible, to deliver the mixed material of the wood-working factory into an open receptacle without any undue dissemination of fine dust, and where a terminal dust collector is employed, as illustrated in the accompanying drawing, it may be made of very small size on account of the small volume of air to be handled, and of the introduction of material thereinto in form conducive to easy separation.

In the foregoing description, I have to some extent expressed my theories of the causes and effects of actions evident in my system which may or may not be academically correct, but it will be understood that such statements are only for purposes of teaching the art according to the best of my understanding. My statements of advantage in character of service, size of parts, and decrease in power, however, are founded upon actual experience, and for practical illustration of such changes as may be made in the substitution of a system for the practice of my invention in lieu of an old system as heretofore employed, I may say that in a commercially operative plant formerly served, as to one half of the mill product only, by an old style system, having a discharge pipe 20 inches in diameter, approximately 600 feet long, with a 70 inch centrifugal fan, and a consumption of about 20 H. P., I have been able by the use of my invention to deliver the whole product of the mill under heaviest working conditions through a 9-inch discharge pipe of the same 600 foot length, with about 7 H. P.

While I have herein described in considerable detail a construction for the embodiment of my invention, it will be understood that I do not desire to be limited thereto, as many changes may be made in the physical devices for the practice of my invention, as defined in the appended claims.

What I claim is:

1. The method of handling miscellaneous materials—consisting of particles and bodies of widely variant specific gravity, size, shape, and surface conditions, such as wood-powder, sawdust, chips, blocks, and long shavings—in long-blow pneumatic systems, which consists in creating in a long, relatively small pipe, an air current of constant volume and variable pressure, and delivering the miscellaneous material into the blow pipe under the influence of said air current in separated relatively-concentrated masses with appreciable intervals between, thereby to afford spaces for the lagging of retarded material without reducing the velocity of the materials-content of the piping as a whole, and to deliver the material at the end of the blow pipe in a relatively concentrated stream.

2. The method of handling miscellaneous materials in long blow pneumatic systems, which consists in creating in a long blow pipe of small cross sectional area an air current of constant volume, charging the pipe with relatively concentrated masses of miscellaneous material wherein the particles of various qualities are intermingled, and initially spacing the masses apart in the pipe to afford spaces for the lagging of retarded particles of each mass without reducing the velocity of the materials-content of the piping as a whole.

3. The method of handling through a long relatively small pipe, heterogeneous materials, such as wood working mill refuse, some particles of which, in air-impelled passage through the pipe, tend to lag behind others deposited therewith, which consists in delivering into said pipe, under the influence of an air current of substantially constant volume and variable pressure, a relatively concentrated mass of such material, allowing a lapse of time before the delivery of another such relatively concentrated mass of material, and thereafter delivering another such relatively concentrated mass, and so on, each said lapse of time leaving behind each delivered concentrated mass a space in the pipe in which the lagging particles of said mass may travel without substantial clogging effect, and which at the end of its traverse of the long pipe shall have become occupied by the lagging particles, for delivery from the end of the pipe of said material—initially delivered thereto in concentrated separated masses—finally in a relatively concentrated stream of substantially unbroken character.

4. The method of effecting long-blow transportation of miscellaneous materials, such as wood-working-mill refuse, which consists in setting up, in a blow-pipe 500 feet or upward in length and of relatively small diameter, proportioned to the volume of material to be handled, an air current of constant volume and of pressure varying with changes of resistance, providing and maintaining a store of the miscellaneous material in a confined area under atmospheric pressure, trapping bodies or charges out of said material store, each independently of the other and each without communication of the blow-pipe pressure to the material store or to the other trapped bodies, and delivering the trapped, relatively concentrated charges into the air current in the blow pipe at spaced intervals, leaving in the blow pipe after each charge a space substantially free from material in which space the lagging particles of the miscellaneous material may travel without substantial clogging effect.

5. The method of effecting long-blow transportation and delivery of miscellaneous materials, such as wood-work-mill refuse, as described, which consists in setting up, in a blow-pipe 500 feet or more in length and of relatively small diameter, proportioned to the volume of material to be handled, an air current of constant volume and variable pressure, varying with changes of resistance in the blow-pipe; providing and constantly maintaining a store of miscellaneous material in a receptacle free from the blow pipe pressure, trapping bodies or charges out of said store by gravity into compartments under atmospheric pressure; transferring said charges singly, at intervals, in their confining compartments, into the air stream of the blow pipe, leaving in the blow pipe after each charge a space substantially free from material, in which spaces the lagging particles of the miscellaneous materials may travel without substantially impeding the rate of flow of the materials-contents of the blow pipe as a whole, for delivery of the material from the end of the pipe in a relatively concentrated stream of substantially unbroken character, and receiving said delivered material in a settling receptacle.

In testimony whereof I hereunto set my hand in the presence of two witnesses.

WHITFORD W. WOODLEY.

In the presence of—
 JNO. M. HARNER,
 J. M. MARTIN.